United States Patent
Kitano et al.

(10) Patent No.: US 9,103,451 B2
(45) Date of Patent: Aug. 11, 2015

(54) DEVICE FOR STOPPING FLOW OF FLUID

(75) Inventors: Junichi Kitano, Moriya (JP); Takashi Wada, Kobe (JP); Kenji Kusunoki, Kobe (JP)

(73) Assignees: Asahi Breweries, Ltd., Tokyo (JP); Kyokko Electric Co., Ltd., Kobe-shi (JP)

( * ) Notice: Subject to any disclaimer, the term of this patent is extended or adjusted under 35 U.S.C. 154(b) by 614 days.

(21) Appl. No.: 12/450,605

(22) PCT Filed: Apr. 4, 2008

(86) PCT No.: PCT/JP2008/056800
§ 371 (c)(1),
(2), (4) Date: Oct. 2, 2009

(87) PCT Pub. No.: WO2008/126798
PCT Pub. Date: Oct. 23, 2008

(65) Prior Publication Data
US 2010/0117011 A1    May 13, 2010

(30) Foreign Application Priority Data
Apr. 5, 2007    (JP) .................. 2007-099007

(51) Int. Cl.
*F16K 7/04* (2006.01)
*F16K 7/06* (2006.01)

(52) U.S. Cl.
CPC ..................... *F16K 7/068* (2013.01)

(58) Field of Classification Search
USPC ............ 251/4, 7, 9; 137/355.18, 355.19, 485, 137/487.5; 604/250
See application file for complete search history.

(56) References Cited

U.S. PATENT DOCUMENTS

| | | | | |
|---|---|---|---|---|
| 2,827,919 | A | * | 3/1958 | Rice et al. ................. 137/505.47 |
| 3,100,486 | A | * | 8/1963 | Nehring ........................ 604/272 |
| 3,182,602 | A | * | 5/1965 | Price ................................ 417/53 |
| 3,187,774 | A | * | 6/1965 | Leigh et al. ............... 137/614.11 |

(Continued)

FOREIGN PATENT DOCUMENTS

| | | |
|---|---|---|
| CN | 1550700 A | 12/2004 |
| DE | 29505836 U1 | 8/1995 |

(Continued)

OTHER PUBLICATIONS

European Search Report, Application No. EP 08 73 9906, three (3) pages, dated Aug. 29, 2012.

*Primary Examiner* — John Rivell
*Assistant Examiner* — Matthew W Jellett
(74) *Attorney, Agent, or Firm* — Judge Patent Associates

(57) ABSTRACT

A device for stopping a flow of fluid in a fixed length of tube with an actuator simple in construction is provided. The stopping device is free of direct touch with the fluid inside the tube, expected not to obstruct the flow in the tube as permitted as possible at normal condition, expected to perform both detection and control with a single device, and further invulnerable to kinds of fluids. The device for stopping a flow of fluid includes a tube holder to keep a tube in looped configuration, a movable part pressing the looped configuration of the tube. Pressing of the looped configuration of the tube make a snapped bent to stop the flow of fluid passed through the tube. Putting the movable part back into place results in the tube's returning from the configuration having the bent, allowing the fluid flowing again through the tube.

11 Claims, 5 Drawing Sheets

(56) References Cited

U.S. PATENT DOCUMENTS

| | | | | |
|---|---|---|---|---|
| 3,305,144 | A | * | 2/1967 | Beres et al. ............... 222/402.13 |
| 3,598,288 | A | * | 8/1971 | Posgate .......................... 222/644 |
| 4,570,898 | A | * | 2/1986 | Staeubli ............................ 251/4 |
| 4,963,131 | A | * | 10/1990 | Wortrich ......................... 604/34 |
| 5,125,891 | A | * | 6/1992 | Hossain et al. ................. 604/34 |
| 5,454,783 | A | * | 10/1995 | Grieshaber et al. ............. 604/30 |
| 6,035,878 | A | * | 3/2000 | Adams et al. ...................... 137/1 |
| 6,056,260 | A | * | 5/2000 | Stewart et al. ..................... 251/7 |
| 6,319,223 | B1 | * | 11/2001 | Wortrich et al. ................ 604/30 |
| 6,422,234 | B1 | * | 7/2002 | Bacon ..................... 128/200.14 |
| 6,511,454 | B1 | * | 1/2003 | Nakao et al. .................... 604/31 |
| 6,669,051 | B1 | * | 12/2003 | Phallen et al. .................... 222/1 |
| 7,469,874 | B2 | * | 12/2008 | Akahori ............................ 251/7 |
| 7,836,914 | B2 | * | 11/2010 | Drott et al. ............... 137/625.47 |
| 7,998,109 | B2 | * | 8/2011 | Gaines et al. ................... 604/65 |
| 2005/0053501 | A1 | | 3/2005 | Akahori |
| 2005/0171501 | A1 | | 8/2005 | Kelly |
| 2009/0182263 | A1 | * | 7/2009 | Burbank et al. ................. 604/28 |
| 2009/0209863 | A1 | * | 8/2009 | Haveri .......................... 600/459 |

FOREIGN PATENT DOCUMENTS

| | | |
|---|---|---|
| FR | 2 768 423 A1 | 3/1999 |
| FR | 2768423 A1 | 3/1999 |
| JP | S55-19974 | 7/1953 |
| JP | S58-91979 A | 6/1983 |
| JP | S2-46171 U | 3/1990 |
| JP | H2-123243 U | 10/1990 |
| JP | 2000-161533 A | 6/2000 |
| JP | 2003-130238 A | 5/2003 |
| JP | 2004-340184 A | 2/2004 |
| JP | 2005-195140 A | 7/2005 |
| JP | 2005-245970 A | 9/2005 |
| JP | 2006-134100 A | 5/2006 |
| WO | 8502000 A1 | 5/1985 |
| WO | 0189609 A1 | 11/2001 |

* cited by examiner

DEVICE FOR STOPPING FLOW OF FLUID

This is a National Phase Application filed under 35 U.S.C. 371 as a national stage of PCT/JP2008/056800, filed on Apr. 4, 2008, an application claiming the benefit of Japanese Patent Application No. 2007-099007, filed on Apr. 5, 2007, the entire content of each of which is hereby incorporated by reference.

BACKGROUND OF THE INVENTION

1. Field of Invention

The present invention relates to the technology of stopping or running a fluid flowing in a tube.

2. Related Art

Currently, various apparatuses have fluid substances such as liquid or gas flowing in a tube. For example, a certain apparatus, such as a beverage server, obtains liquid beverage stored in a tank via a tube connected to the tank. Usually, such a tube is soft, transparent, and flexible. Moreover, an ON/OFF valve installed at an end of the tube to control a flow of the liquid beverage in the tube, or a mechanism for squishing a peripheral part of the tube in the middle of the tube is further configured.

Moreover, as a device for regulating or stopping a flow of a fluid in a tube, for example, a device used in a medical tube, a clamp mechanism is well known (for example, with reference to Patent Document 1 and Patent Document 2).

Patent Document 1: Japanese Patent Publication No. H07-313594

Patent Document 2: Japanese Utility Model Patent Publication No. H07-46268

SUMMARY OF THE INVENTION

However, for a mechanism using a valve to stop fluid, as the valve is located within a tube, the contents of food or medicines in the tube are possibly contaminated. Moreover, a mechanism for squishing a tube peripheral part located in the middle of the tube may exert an excessively large load on the tube, thereby possibly causing damages to the tube.

Furthermore, a tube clamp mechanism used in medical applications is applied on very soft tubes for transfusion, which is not applicable to a high-intensity tube for containing pressurized fluid.

In view of the above problems, the present invention is directed to a device for stopping a flow of fluid. The stopping device is free of direct touch with the fluid inside a tube, which is expected not to obstruct the flow in the tube as permitted as possible at normal condition and expected to perform both detection and control with a single device, and is also invulnerable to kinds of fluids. The device for stopping a flow of fluid can stop a flow of fluid in a high-intensity tube for pressurized fluid by using an actuator simple in construction.

In order to achieve the above objectives, in a first implementation, the present invention provides a device for stopping a flow of fluid, which includes a tube holder 5 keeping a tube 1 in a looped configuration and a movable part 4 pressing the looped configuration of the tube 1. The movable part 4 presses the tube 1 in the looped configuration to make a bent 2 on the tube 1, in which results in stopping a flow of fluid 3 passed through the tube 1. Moreover, when putting the movable part 4 back into place, the tube 1 returns from the configuration having the bent 2, allowing the fluid 3 to flow through the tube 1 again.

Specifically, a drive means of the movable part 4 is preferably based on a mechanical force generated by a motor, an electromotive force generated from an electromagnetic force, or a manual force. The drive means of the movable part may be for example a motor, a plunger, a spring, and a manual knob.

Especially, in the first implementation of the device for stopping a flow of fluid, positions of the bent 2 and the movable part 4 pressing the looped configuration of the tube 1 are adjusted. Therefore, fluid under a high pressure flowing in the tube 1 is easily stopped through a leverage effect. That is to say, as the position of the movable part 4 exerting an external force on the tube 1 becomes farther away from the bent 2, merely a smaller force is needed to bend the tube 1 under the leverage principle. Therefore, a load of the drive means is decreased and an operation cost of the device is reduced.

Next, in a second implementation, the present invention provides a device for stopping a flow of fluid, in which a rotation table mechanism is use on a holder for supporting partial periphery of a tube 1. The rotation table mechanism rotates to make a bent 2 on the tube 1, which results in stopping a flow of fluid 3 passed through the tube 1. Moreover, when putting the rotation table mechanism back into place, the tube 1 returns from the configuration having the bent 2, allowing the fluid 3 to flow through the tube 1 again.

Specifically, a drive means of the rotation table mechanism operates preferably based on a mechanical force generated by a motor, an electromotive force generated from an electromagnetic force, or a manual force.

Moreover, in a third implementation, the present invention provides a device for stopping a flow of fluid, in which at least two holders for supporting a partial periphery of a tube 1 are used. A relative distance between the holders is increased to make a bent 2 on the tube 1, in which results in stopping a flow of fluid 3 passed through the tube 1. Moreover, when putting the distance between the holders back into place, the tube 1 returns from the configuration having the bent 2, allowing the fluid 3 to flow through the tube 1 again.

Specifically, a drive means of the holders operates preferably based on a mechanical force generated by a motor, an electromotive force generated from an electromagnetic force, or a manual force.

Moreover, in the device for stopping a flow of fluid in the first to third implementations of the present invention, a detection means for detecting one or more parameters including a fluid change in a tube such as liquid exhaustion, a liquid leakage, a temperature, or a vibration is included. The drive means operates automatically according to a signal from the detection means to stop or run the fluid in the tube.

Moreover, in the device for stopping a flow of fluid in the first to third implementations of the present invention, a non-contact detection means using near infrared, ultrasonic wave, electric wave, or electrostatic capacitance is included. The drive means operates automatically according to a signal from the detection means to stop or run the fluid in the tube.

Moreover, in the device for stopping a flow of fluid in the first to third implementations of the present invention, the drive means operates also automatically according to an electric signal from an operation portion installed in the device for stopping a flow of fluid and/or an electric signal from exterior, so as to stop or run the fluid in the tube.

Moreover, in the device for stopping a flow of fluid in the first to third implementations of the present invention, the drive means operates by electromotive force to stop the fluid, and in order to release the stopping status to put the drive means into place, the drive means return by using the manual force.

Furthermore, a means for informing to replace a tube when a drive time of the drive means exceeds a defined threshold value about the drive time is further included. Therefore, the drive times of the drive means corresponding to a pre-calculated endurance of the tube may be considered to determine timing for replacing the tube.

Moreover, the tube 1 of the device for stopping a flow of fluid is connected to a tube outside the device through a joint portion 8, and if the tube 1 can be easily detached from the joint portion 8, when the tube 1 is deteriorated, the device can continue to be used simply by replacing the tube.

Alternatively, the joint portion 8 is enabled to be easily detached from a unit case 9 that constitutes a housing of a body of the device, such that the joint portion 8 and the tube 1 may be replaced as a set, and thus a suitable method for replacing a tube may be selected according to a use or a purpose.

Moreover, according to the applications, in the device for stopping a flow of fluid, a plurality of fluid stop mechanisms is connected as a cascade and/or an auxiliary stop/run means such as a pinch valve is further added. When the stopping process is performed in this manner, slight leakage might occur for different applications. At this time, the device for stopping a flow of fluid may also be configured with a cascade in multi-stage to form a plurality of stop mechanisms, or a conventional pinch valve may be added to serve as an auxiliary stop/run means, so as to avoid the leakage.

Moreover, according to the applications, in the device for stopping a flow of fluid, the drive amount of the fluid stop mechanisms changes with at least one of the factors such as leakage detection, a temperature change, a pressure change, and time duration in the stopping process.

The leakage in the stopping process may also be adjusted. For example, the drive amount of the fluid stop mechanism for deforming the tube 1 immediately once the leakage is detected is slightly increased, so as to avoid the leakage. Alternatively, when it is figured out that a stopping function of the tube 1 is reduced under conditions that a temperature rises, a pressure increases, or a long time duration elapsed, the adjustment is performed according to the temperature change, pressure change, or time duration. For example, the changes are generated to the drive amount for deforming the tube 1 similarly, such that a stop performance is maintained.

In addition, the movable part 4 presses the looped configuration of the tube 1 may also be extended to a length capable of directly pressing the bent 2 during the stopping process, such that the bent 2 is pressed directly when the movable part 4 presses, thereby stopping the fluid more reliably. Alternatively, a mechanism for reliably pressing the bent 2 through such an extended portion may also be formed and installed.

Effects of the Invention

As the device for stopping a flow of fluid of the present invention has already been designed into the above structure, no mechanisms for contacting with the liquid in a conventional fluid control device such as a stop valve are required, so as not to directly contact with the fluid in the tube. At normal conditions, a shape (configuration or an internal diameter) of a tube is maintained constant, such that a flow in the tube is not obstructed. Both detection and control are performed with a single device. The device for stopping a flow of fluid is invulnerable to kinds of fluids. A device mechanism for stopping a flow of fluid flowing in the tube is realized in a simple structure.

For example, as for a beer server for providing draft beer, in order to properly clean a tube that is dirty inside, a cleaning sponge is made to penetrate the tube to remove bacteria. However, if a hidden valve is used, the sponge might be stuck, resulting in difficulties in usage. However, in this implementation, the internal diameter of the tube is kept constant, such that the cleaning sponge easily penetrates a whole flow path of the device.

Moreover, in other technologies of stopping fluid without contacting with liquid inside a tube, a pinch valve is included. However, as the pinch valve is a mechanism for directly pressing the tube 1 by a pressing portion for stopping the fluid, a great force is needed. For example, a large current is required to stop the tube 1 that bears a tap water pressure. Thus, the pinch valve is difficult to be realized. In contrast, in this implementation, positions of the bent 2 and the movable part 4 pressing the looped configuration of the tube 1 are adjusted, so that a flow of high-pressure fluid flowing in the tube 1 is easily stopped with a very small force under a leverage effect. This means that the drive means is subject to a small load and miniaturization of the device and decreasing of an operation cost can be easily realized.

DETAILED DESCRIPTION OF THE INVENTION

The preferred embodiments of the present invention are illustrated below with reference to the accompanying drawings.

First Embodiment

Figure 1A:
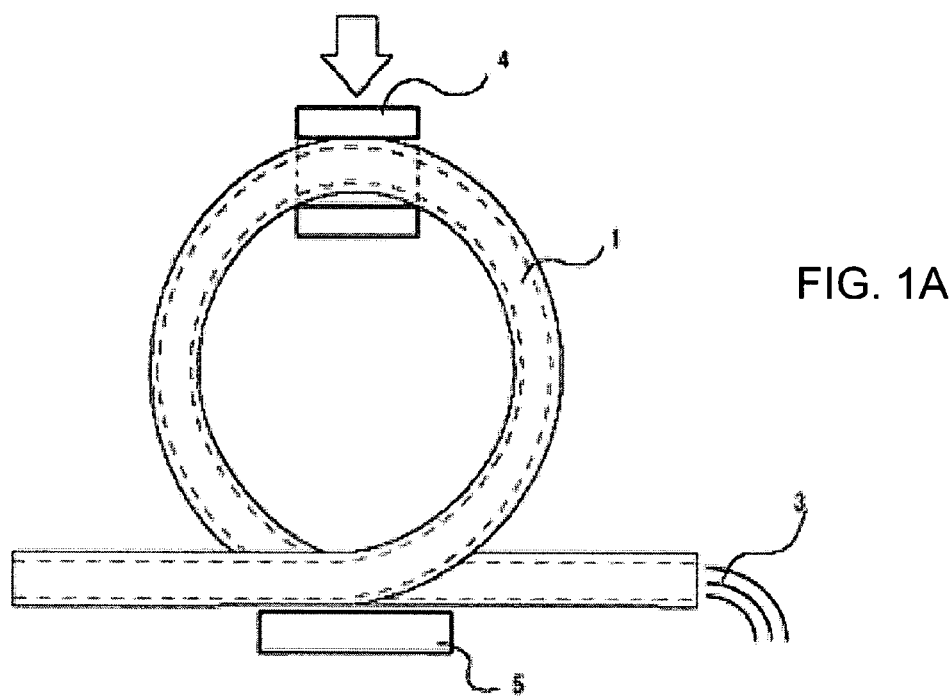
FIG. 1 shows schematically a principle of a device for stopping a flow of fluid according to a first embodiment.
Figure 1B:
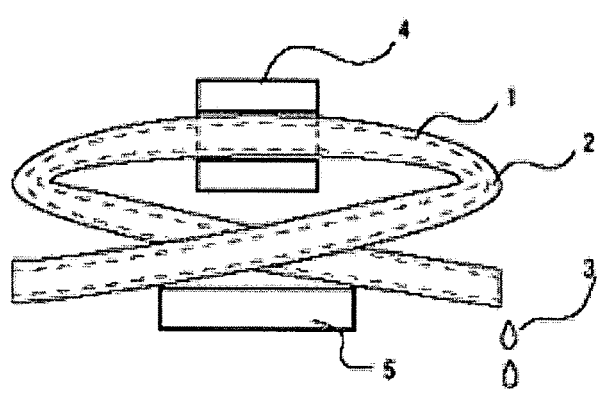

FIG. 1 shows schematically a principle of a device for stopping a flow of fluid according to a first embodiment. The device in the first embodiment includes a tube holder 5 for keeping a tube 1 in a looped configuration and a movable part 4 for pressing the looped configuration of the tube 1. As indicated by an arrow in FIG. 1(a), the movable part 4 presses the tube 1 in the looped configuration to make a bent 2 on the tube 1, which results in stopping a flow of fluid 3 passed through the tube 1, as shown in FIG. 1(b).

Moreover, when putting the movable part 4 back into place, the tube 1 returns from the configuration having the bent 2, allowing the fluid 3 to flow through the tube 1 again.

Herein, only the movable part 4 moves in a downward arrow direction in FIG. 1(a). However, the tube holder 5 may also move in an upward arrow direction.

Figure 2A:
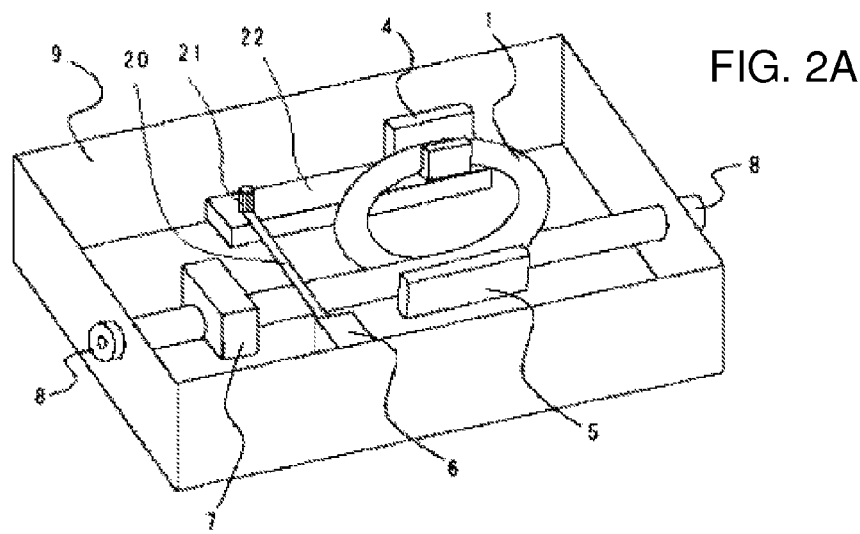
FIG. 2A and FIG. 2B each show schematically a structural view of the device for stopping a flow of fluid according to the first embodiment.
Figure 2B:
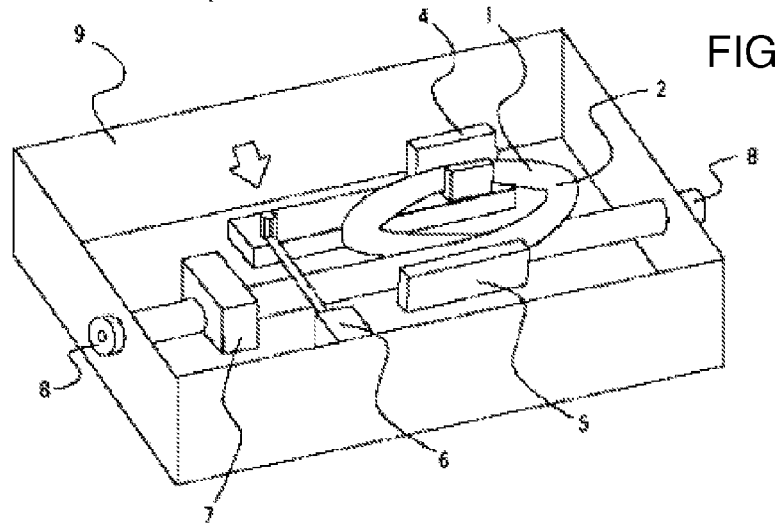

Next, FIG. 2A and FIG. 2B each show schematically configuration diagram of the device for stopping a flow of fluid according to the first embodiment. FIG. 2A and FIG. 2B each show an inner structure of the device in a form of a perspective view after a top cover of a unit case is removed. In a unit case 9, the tube holder 5 used for keeping a tube 1 in a looped configuration and the movable part 4 pressing the looped configuration of the tube 1 are included. Moreover, a drive means 6 of the movable part 4 and a liquid monitoring sensor 7 inside the tube are included.

Moreover, a joint portion 8 disposed at the unit case 9 is a joint portion for connecting an external tube with an internal tube. Specifically, the joint portion 8 is a joint for connecting two tubes together. If a joint is used, the attachment/release of the joint portion 8 and the tube 1 becomes much easier. When the tube 1 deteriorates, the tube 1 can also be easily replaced. Alternatively, a structure for enabling the joint portion 8 to be easily detached from the unit case 9 may also be used. In this case, operations of periodically replacing the portions in direct contact with the fluid in the device may be simply performed. Moreover, without the joint portion 8, the tube 1 may be directly extended in a single direction or in two directions from the device.

In addition, when the above manner of the present invention is used for stopping, a tiny amount of fluid might leak from a stop portion because of application such as different materials of the tube 1, kinds of the fluids, temperature or pressure change. When such leakage is not permitted, although not shown, for example, the loop portions of the tube 1 may be configured into a plurality of structures, or a conventional pinch valve may be added to serve as an auxiliary stop/run means, thereby avoiding such leakage. Although it is difficult to use the pinch valve in environments of a high pressure such as a tap water pressure because of the pinch valve generating a relatively small force to press the tube 1, the pinch valve can easily stop the flow path at a low pressure portion where a tiny amount of leakage occurs. By using a separated structure, the stop portion in a front stage performs for main stopping functions and the stop portion in a rear stage or the pinch valve perform for stopping a tiny amount of leakage, a structure having no fluid leakage is formed.

In the case that the means for detecting a leaked fluid at the time of stopping the tube 1 is further used as other means, the adjustment for more press the tube 1 immediately, for example, a pressing-driving amount (stroke amount) of a motor as a drive means of a fluid stop mechanism is increased, maintains the stopping function.

Moreover, sometimes deformation portions of the tube 1 are slowly changed due to materials of the tube, kinds of the fluids, ambient temperature, an increased pressure in the tube, or a continuously maintained high pressure status in the stopping process and a stopping function is gradually reduced. Also, a temperature sensor, a pressure sensor, or a time measurement timer for recognizing a temperature change, a pressure change, or time duration is further added. Based on the information, a pressing-driving amount of a motor for deforming the tube 1 is made to generate a change in the same manner, so as to maintain the stopping function.

Moreover, in the same status, the movable part 4 energized to squish the looped configuration of the tube 1 may also be extended to a length capable of directly pressing the bent 2 in the stopping process. The movable part 4 presses the bent 2 directly when pressing, so as to maintain the stopping function. Alternatively, a mechanism for pressing the bent 2 more reliably by thickening at the extended portion to a pressing direction or a mechanism for holding the bent 2 may be further added.

Here, an electric motor serves as the drive means 6 of the movable part 4. The electric motor actuates a joint 20, so as to drive a movable stage 22 connected at a joint portion 21. As indicated by an arrow in FIG. 2(b), the joint 20 is pulled towards one side of the electric motor. Subsequently, the movable stage 22 is pulled to approach one side of the tube holder 5. Accordingly, the movable part 4 is drawn close to the side of the tube holder 5 and presses the looped configuration of the tube 1.

Besides the above motions made by the joint 20 under the drive of the electric motor, for example, the motions may further include counterclockwise rotation with the electric motor as a center (as seen from the top). Subsequently, the movable stage 22 is pulled to approach the side of the tube holder 5 and the movable part 4 is drawn close to the side of the tube holder 5, so as to be energized to squish the looped configuration of the tube 1.

In addition, a plunger, a spring, a manual knob may also be used to replace the electric motor.

Next, a function of the liquid monitoring sensor 7 in the tube is further illustrated. The liquid monitoring sensor is set in the tube, which aims at monitoring whether the liquid is exhausted or whether impurities are mixed in the liquid, so as to manage a quality of the liquid in the tube. Here, a liquid monitoring sensor including a light projecting element, a light receiving element, and a signal processing portion is used as the liquid monitoring sensor 7 in the tube.

Specifically, in the liquid monitoring sensor in the tube, the light projecting element is disposed at an outer side of the liquid flow tube, and the light receiving element is disposed at an outer side of the liquid flow tube facing the light projecting element, so as to receive the light projected by the light projecting element. The signal processing portion detects whether liquid flows in the liquid flow tube, whether a bubble or a foreign matter exists or not, whether the liquid flow tube itself has dirt or not, or whether any combination of this kind of situations exists or not according to a level of a light receiving amount of the light receiving element.

As discussed above, the level of a light receiving amount of the light receiving element varies according to statuses of liquid exhaustion, bubble generation, or foreign matter interfusion. The liquid monitoring sensor 7 in the tube utilizes this feature, and the signal processing portion thereof categorizes the levels of the light receiving amount, so as to detect various internal statuses. Moreover, the liquid monitoring sensor 7 in the tube detects bubbles by using the light receiving amounts and takes the existence of bubbles as effective information inside the flow liquid such as a sign of liquid exhaustion or insufficient air pressure.

The drive means 6 of the movable part 4 is operated or not operated according to an output signal of the liquid monitoring sensor 7 in a tube corresponding to changes of statuses of the liquid in the tube 1, so as to stop or run the fluid in the tube 1.

As for the device for stopping a flow of fluid in the first embodiment, there is no valve in direct contact with the fluid 3 in the tube 1 and an internal diameter of the tube in the device is basically maintained constant, the device is expected not to obstruct the flow in the tube 1 as permitted as possible at normal condition and expected to perform both detection (the liquid monitoring sensor 7 in the tube) and control (the drive means 6 of the movable part) with a single device, and is also invulnerable to kinds of the fluids 3. An actuator for choking a flow of fluid in the tube 1 may be implemented through a simple structure.

Second Embodiment

Figure 3A:
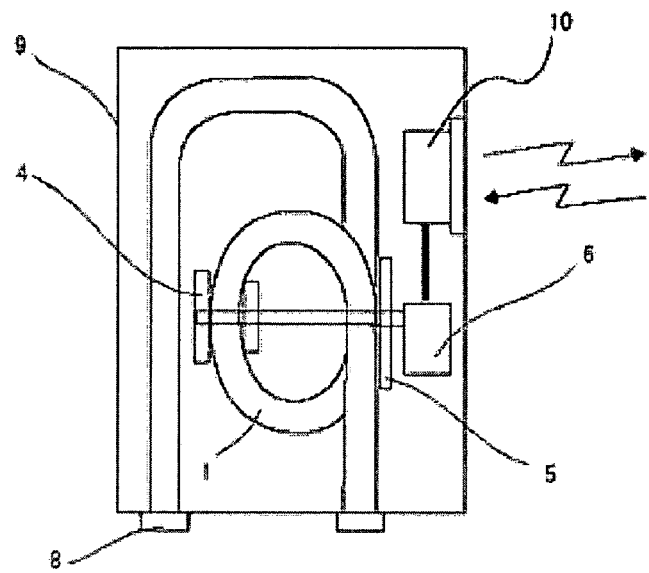
FIG. 3 shows schematically a structural view of a device for stopping a flow of fluid according to a second embodiment.

Next, in the second embodiment, a implementation of the device for stopping a flow of fluid is illustrated, the device stopping or running the fluid in the tube 1 according to a signal from a near infrared sensor. FIG. 3 shows schematically a structural view of a device for stopping a flow of fluid according to a second embodiment.

Figure 3B:
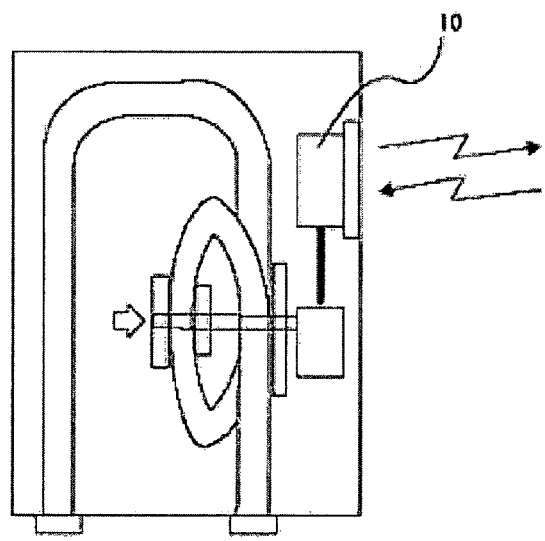

As shown in FIG. 3, the drive means 6 of the movable part operates according to a signal from a near infrared sensor 10. As indicated by an arrow in FIG. 3(b), the movable part 4 presses the tube 1 in the looped configuration to make a bent 2, which results in stopping the flow of fluid 3 passed through the tube 1. Moreover, when putting the movable part 4 back into place, the tube 1 returns from the configuration having the bent 2, allowing the fluid to flow through the tube 1 again.

A non-contact detection means using an ultrasonic wave, an electric wave, or electrostatic capacitance may also be used to replace the near infrared sensor 10. The drive means 6 is automatically actuated according to a signal from the non-contact detection means to stop or run the fluid in the tube.

Third Embodiment

In the third embodiment, another implementation of a device for stopping a flow of fluid used for stopping or running liquid in a tube 1 is illustrated. In the device for stopping a flow of fluid in the third embodiment, a rotation table mechanism 12 is arranged in a holder 11 for supporting a partial periphery of the tube 1. The rotation table mechanism 12 rotates to make a bent 2, which results in stopping a flow of fluid passed through the tube 1. Moreover, after putting the rotation table mechanism back into place, the tube 1 returns from the configuration having the bent 2, allowing the fluid to flow through the tube 1 again.

Figure 4A:
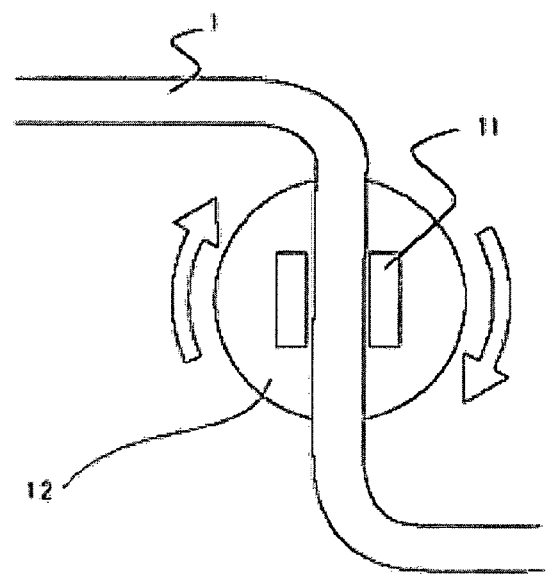
FIG. 4 shows schematically a principle of a device for stopping a flow of fluid according to a third embodiment.
Figure 4B:
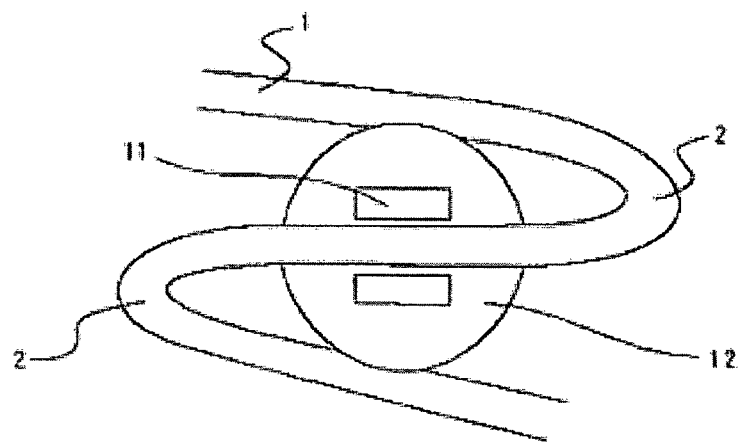

FIG. 4 shows schematically a principle of a device for stopping a flow of fluid according to a third embodiment. As shown in FIG. 4(a), if the rotation table mechanism 12 rotates in a clockwise arrow direction, the holder 11 installed on the rotation table mechanism 12 also rotates. As the holder 11 holds the periphery of the tube 1, for example, the 90-degree rotation as shown in FIG. 4(b), the bent 2 is made on the tube 1, which in results in stopping the flow of the fluid passed through the tube 1. Moreover, when putting the rotation table mechanism back into place, the tube 1 returns from the configuration having the bent 2, allowing the fluid to flow through the tube 1 again.

Moreover, the actuator is merely required to actuate the rotation table mechanism 12. For example, the actuator may be simply an electric motor.

In addition, the holder 11 may also be integrated with the rotation table mechanism 12 that rotates.

Fourth Embodiment

Next, in the fourth embodiment, another implementation of a device for stopping a flow of fluid used for stopping or conducting liquid in a tube 1 is illustrated. In the device for stopping a flow of fluid in the fourth embodiment, two holders (17, 18) for supporting a partial periphery of the tube 1 are arranged. A relative distance between the two holders (17, 18) is increased to make the bent 2 on the tube 1, which results in stopping a flow of fluid passed through the tube 1. Moreover, when putting the distance between the holders (17, 18) back into place, the tube 1 returns from the configuration having the bent 2, allowing the fluid to flow through the tube 1 again.

Figure 5A:
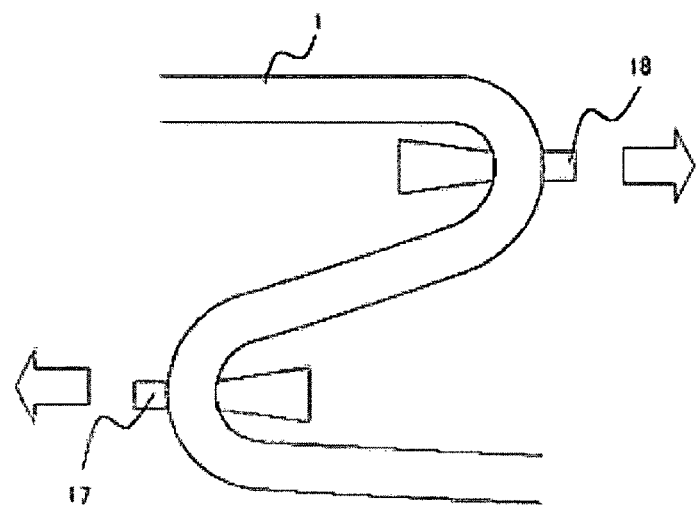
FIG. 5 shows schematically a principle of a device for stopping a flow of fluid according to a fourth embodiment.
Figure 5B:
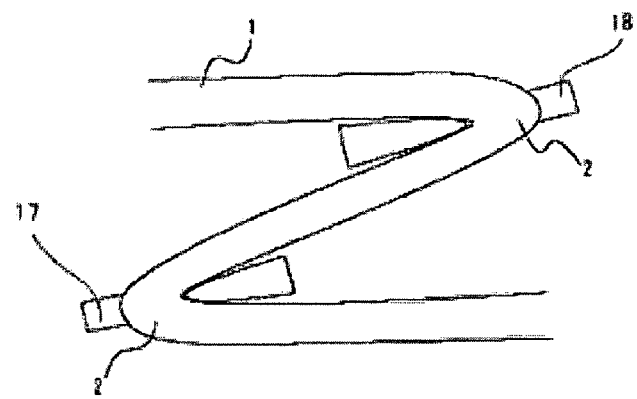

FIG. 5 shows schematically a principle of a device for stopping a flow of fluid according to a fourth embodiment. If the two holders (17, 18) respectively move in parallel along arrow directions as shown in FIG. 5(a), the holders (17, 18) make the bent 2 on the tube 1, which results in stopping the flow of the fluid passed through the tube 1, as shown in FIG. 5(b). Moreover, after putting the holders (17, 18) back to original positions, the tube 1 returns from the configuration having the bent 2, allowing the fluid to flow through the tube 1 again.

INDUSTRIAL APPLICABILITY

The present invention can be applied as a device for stopping/running flows of fluids in a tube in a beverage server such as beer server. Moreover, the present invention can also be widely used in medical, food, and industrial applications. In addition, the present invention is not limited to being used for liquids, but may also be widely used in technologies of powder and gas.

LIST OF REFERENCE NUMERALS

1 Tube
2 Bent of tube
3 Liquid flowing in the tube
4 Movable part
5 Tube holder
6 Drive means of the movable part
7 Liquid monitoring sensor in the tube
8 Joint portion
9 Unit case
10 Infrared sensor
11 Holder
12 Rotation table mechanism
17, 18 Holders (moving to cause a change of the relative distance there-between)
20 Joint
21 Joint portion
22 Movable stage

What is claimed is:

1. A fluid-flow stopping device, comprising:
a length of tube being of strength enabling said tube to contain pressurized fluids flowing through said tube, while being bendable such that said tube can be bent toward itself;
a tube holder configured to keep said tube in a looped conformation in which said tube is doubled over onto itself in a crossed-over portion, such as to define loop-inflow and loop-outflow directions that are substantially the same at the crossed-over portion, said tube holder therein supporting the looped tube at the crossed-over portion; and
a movable part positioned along an opposing portion of said looped tube, directly opposite the crossed-over portion, said movable part being configured so as to shift the opposing portion of said looped tube diametrically toward the crossed-over portion by an extent predetermined to deform the looped conformation and form an opposed pair of fluid-flow stopping pinched bends in said tube, said movable part therein shifting the formed bends toward the tube holder, and configured so as to shift the opposing portion of said tube away from the crossed-over portion by the predetermined extent, thereby releasing the fluid-flow stopping pinched bends in said tube and restoring the looped conformation of said tube.

2. The fluid-flow stopping device according to claim 1, wherein said movable part comprises a drive means configured for at least one of mechanically, electromotively, and manually operating said movable part.

3. The fluid-flow stopping device according to claim 2, further comprising a detection means for detecting one or more parameters selected from a group consisting of: a change in status of fluid in said tube, temperature of said tube, and vibration in said tube; wherein:

said detection means and said drive means are configured so that according to a detection signal from said detection means said drive means operates automatically to stop fluid flow in said tube or allow fluid flow in said tube to run.

4. The fluid-flow stopping device according to claim 3, wherein said detection means is a non-contact detection means.

5. The fluid-flow stopping device according to claim 3, wherein said drive means is configured to operate automatically according to a signal from an operation portion installed in the fluid-flow stopping device and/or a signal from the exterior of the fluid-flow stopping device.

6. The fluid-flow stopping device according to claim 2, wherein said drive means is configured to operate electromotively to stop fluid flow in said tube, and to be manually operable to allow fluid flow in said tube to run.

7. The fluid-flow stopping device according to claim 1, wherein said tube is connected through a joint portion to a tube external to the fluid-flow stopping device, and said tube is detachable from the joint portion, such that said tube is replaceable.

8. The fluid-flow stopping device according to claim 7, wherein the joint portion is detachable from a unit case, such that the joint portion and said tube are replaceable as a set.

9. The fluid-flow stopping device according to claim 1, wherein said movable part is of length such as to allow said movable part to directly press on the fluid-flow stopping pinched bends.

10. The fluid-flow stopping device according to claim 1, wherein said movable part is of length such as to allow said movable part to directly press on the fluid-flow stopping pinched bends, the fluid-flow stopping device further comprising means for pressing the movable part against the fluid-flow stopping pinched bends.

11. The fluid-flow stopping device according to claim 1, wherein said tube is of strength enabling said tube to contain fluids pressurized at least to tap-water pressure.

* * * * *